US011682193B2

(12) United States Patent
Chen et al.

(10) Patent No.: US 11,682,193 B2
(45) Date of Patent: *Jun. 20, 2023

(54) SYSTEM AND METHOD FOR REAL-TIME SUPERVISED MACHINE LEARNING IN ON-SITE ENVIRONMENT

(71) Applicant: Lindong Technology (Beijing) Co. Ltd., Beijing (CN)

(72) Inventors: Chiung-Lin Chen, Beijing (CN); Meng Yao, Beijing (CN)

(73) Assignee: Lingdong Technology (Beijing) Co. Ltd., Beijing (CN)

( * ) Notice: Subject to any disclaimer, the term of this patent is extended or adjusted under 35 U.S.C. 154(b) by 41 days.

This patent is subject to a terminal disclaimer.

(21) Appl. No.: 17/379,122

(22) Filed: Jul. 19, 2021

(65) Prior Publication Data

US 2021/0389775 A1    Dec. 16, 2021

Related U.S. Application Data

(63) Continuation of application No. 16/305,007, filed as application No. PCT/CN2018/115556 on Nov. 15, 2018, now Pat. No. 11,092,968.

(51) Int. Cl.
*G06K 9/62* (2022.01)
*G06V 10/774* (2022.01)
(Continued)

(52) U.S. Cl.
CPC ......... *G06V 10/774* (2022.01); *G05D 1/0088* (2013.01); *G05D 1/0212* (2013.01);
(Continued)

(58) Field of Classification Search
CPC .. G05D 1/0246; G05D 1/0088; G05D 1/0212; G05D 2201/0216; G05D 1/0248;
(Continued)

(56) References Cited

U.S. PATENT DOCUMENTS 9,336,483 B1   5/2016 Abeysooriya et al.
9,443,192 B1   9/2016 Cosic
(Continued)

FOREIGN PATENT DOCUMENTS

CN   101800849 A   8/2010
CN   103164673 A   6/2013
(Continued)

OTHER PUBLICATIONS

International Search Report for PCT International Application PCT/CN2018/115556, dated Nov. 15, 2018.
(Continued)

*Primary Examiner* — Samir A Ahmed

(57) ABSTRACT

An automatic guided vehicle (AGV) comprising a mobile base including a drive train and configured to drive the AGV in a self-navigation mode within a facility, a first camera configured to capture first image data of objects within the facility, a second camera configured to capture second image data of objects within the facility, the second camera including a content filter, and a main control module configured to receive the first and second image data from the first and second cameras. The main control module executes a recognition neural network program. The neural network program recognizes targets in the first image data. The main control module also executes a supervisor program under user control. The supervisor program is receives the second image data and recognizes markers attached to targets in the second image data. The supervisor program produces a supervised outcome in which targets to which markers are attached are associated with categories based on user commands. The supervised outcome adjusts weights of nodes in the recognition neural program.

20 Claims, 9 Drawing Sheets

(51) Int. Cl.
  *G05D 1/00* (2006.01)
  *G05D 1/02* (2020.01)
  *G06N 3/08* (2023.01)
  *G06V 10/82* (2022.01)
  *G06V 20/10* (2022.01)

(52) U.S. Cl.
  CPC ............ *G05D 1/0246* (2013.01); *G06N 3/08* (2013.01); *G06V 10/82* (2022.01); *G06V 20/10* (2022.01); *G05D 2201/0216* (2013.01); *G06T 2207/20081* (2013.01); *G06T 2207/20084* (2013.01)

(58) Field of Classification Search
  CPC ............ G06N 3/08; G06T 2207/20081; G06T 2207/20084; G06V 10/774; G06V 10/82; G06V 20/10; G06K 9/6268
  See application file for complete search history.

(56) References Cited

U.S. PATENT DOCUMENTS

| | | | |
|---|---|---|---|
| 9,665,799 | B1 | 5/2017 | Munteanu et al. |
| 9,892,344 | B1 | 2/2018 | Tran et al. |
| 10,346,659 | B1 | 7/2019 | Ahmed et al. |
| 11,092,968 | B2 * | 8/2021 | Chen .................. G05D 1/0212 |
| 2008/0232698 | A1 | 9/2008 | Shi et al. |
| 2008/0260239 | A1 | 10/2008 | Han et al. |
| 2016/0193732 | A1 | 7/2016 | Breazeal et al. |
| 2017/0357877 | A1 | 12/2017 | Lin et al. |
| 2018/0330238 | A1 | 11/2018 | Luciw et al. |
| 2019/0164110 | A1 | 5/2019 | Shiraishi |
| 2019/0228495 | A1 | 7/2019 | Tremblay et al. |
| 2019/0384303 | A1 | 12/2019 | Muller et al. |
| 2020/0279129 | A1 | 9/2020 | Batchelor et al. |

FOREIGN PATENT DOCUMENTS

| | | |
|---|---|---|
| CN | 103473558 A | 12/2013 |
| CN | 104754311 A | 7/2015 |
| CN | 105678278 A | 6/2016 |
| CN | 106647758 A | 5/2017 |
| CN | 107330405 A | 11/2017 |
| CN | 107796374 A | 3/2018 |
| CN | 108009625 A | 5/2018 |
| CN | 108230291 A | 6/2018 |
| CN | 108399398 A | 8/2018 |
| CN | 108445882 A | 8/2018 |

OTHER PUBLICATIONS

Yi Cheng et al.,"Improved RGB-D vision SLAM algorithm for mobile robot", 2017 29th Chinese Control And Decision Conference, CCDC ,May 28-30, 2017, IEEE Xplore: Jul. 17, 2017, pp. 5419-5423.

Matteo Munaro et al., "Open PTrack: Open source multi-camera calibration and people tracking for RGB-D camera networks" Robotics and Autonomous Systems, vol. 75, Part B, Jan. 2016, pp. 525-538.

Chinese Office Action and Search Report for corresponding Application No. 201820038567.4, dated Nov. 24, 2022.

\* cited by examiner

US 11,682,193 B2

SYSTEM AND METHOD FOR REAL-TIME SUPERVISED MACHINE LEARNING IN ON-SITE ENVIRONMENT

RELATED APPLICATIONS

This application is continuation of U.S. patent application Ser. No. 16/305,007, filed Nov. 27, 2018, which is a U.S. National Phase Entry of International Patent Application No. PCT/CN2018/115556, filed Nov. 15, 2018, which is incorporated herein by reference for all purposes.

TECHNICAL FIELD

The present application relates generally to automated guided vehicles and, more specifically, to automated guided vehicles capable of real-time supervised learning.

BACKGROUND

An automated (or automatic) guided vehicle (AGV) is a mobile robot that is capable of self-navigation using, for example, markers, wires, or metal strips on the floor, camera vision, magnets, lasers or a combination of these elements. An AGV is most often used in industrial applications, such as transporting materials around a factory or warehouse. The number and types of applications for automated guided vehicles have greatly increased in recent years.

Warehouse fulfillment AGVs often rely on computer vision (CV) to recognize a target (e.g., a payload or person) and the environment (e.g., warehouse). In current practice, the operating system or similar control program of an AGV is trained by the AGV manufacturer before delivery to a customer facility. This means the AGV manufacturer uses a default dataset (or a predetermined, pre-labelled dataset) to train the neural network of the AGV for target recognition—for example, teaching the AGV control program to identify a human, an object, an environment, and the like.

However, in practice, the performance of the trained neural network of an AGV is often not as good as expected. This is particularly true when the actual (or real-time) environment differs in significant ways from the default dataset used for training. In fact, there are often significant differences between the default dataset used in training and the actual environment with respect to such factors as warehouse lighting conditions, worker uniforms (or other clothing), the appearance of shelves, and the like. These differences may result in low recognition rates and a bad user experience. However, it is very difficult for AGV manufacturers to keep track of actual facility conditions and to make new datasets to fit each environment for every customer.

Therefore, there is a need in the art for improved automated guided vehicle (AGV) systems. In particular, there is a need for an AGV system that may readily be trained in a real-world environment after delivery of the AGV system to a customer facility.

SUMMARY

To address the above-discussed deficiencies of the prior art, it is a primary object to provide an automatic guided vehicle (AGV) comprising: i) a mobile base including a drive train and configured to drive the AGV in a self-navigation mode within a facility; ii) a first camera configured to capture first image data of objects within the facility; iii) a second camera configured to capture second image data of objects within the facility, the second camera including a content filter; and iv) a main control module configured to receive the first and second image data from the first and second cameras, respectively. The main control module is further configured to execute a recognition neural network program. The recognition neural network program is operable to recognize targets in the first image data. The main control module is also configured to execute a supervisor program under user control. The supervisor program is configured to receive the second image data and to recognize markers attached to targets in the second image data. The supervisor program produces a supervised outcome in which a first target to which a first marker is attached is associated with a first category and uses the supervised outcome to adjust at least one weight of at least one node in the recognition neural program.

In one embodiment, the markers are identified by the content filter.

In another embodiment, the content filter is a color filter that identifies a unique color associated with a marker.

In still another embodiment, the content filter identifies a unique pattern associated with a marker.

In yet another embodiment, the supervisor program produces the supervised outcome by associating the first target to which the first marker is attached with the first category based on user input commands.

In a further embodiment, the first category comprises human recognition.

In a still further embodiment, the first category comprises target-to-follow.

In a yet further embodiment, the supervisor program uses the supervised outcome to update a default dataset associated with the recognition neural network program using the real-world information associated with the supervised outcome.

In one embodiment, the real-world information is associated with clothing worn by persons in the first and second image data.

In another embodiment, the real-world information is associated with physical infrastructure of the facility in the first and second image data.

It is another primary object to provide a method of training an automatic guided vehicle (AGV) comprising a mobile base including a drive train and configured to drive the AGV in a self-navigation mode within a facility. The method comprises: i) in a first camera capturing first image data of objects within the facility; ii) in a second camera capturing second image data of objects within the facility, the second camera including a content filter; iii) in a main control module, receiving the first and second image data from the first and second cameras, respectively; iv) in the main control module, executing a recognition neural network program using pre-labelled image data stored in a default dataset, the recognition neural network program operable to recognize targets in the first image data using the pre-labelled image data; v) in the main control module, executing a supervisor program under user control, the supervisor program configured to receive the second image data and to recognize markers attached to targets in the second image data, the supervisor program producing a supervised outcome in which a first target to which a first marker is attached is associated with a first category; and vi) using the supervised outcome to adjust at least one weight of at least one node in the recognition neural program.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged automated guided vehicle (AGV) system.

The present disclosure describes an AGV system that enables the neural network program of the AGV to improve itself when the AGV enters a new environment that does not match the default dataset of the neural network program. This is accomplished by means of a real-time supervisor program that updates the default dataset. The user (or operator) of the AGV launches a network training mode in the AGV to perform supervised learning. The supervisor process relies on user selected optical markers that the computer vision camera(s) of the AGV are trained to recognize in order to update particular functions (e.g., human recognition function, people following function, self-navigation function, obstacle avoidance function, etc.).

The AGV uses a first camera to provide visual input data to a recognition neural network of the AGV and a second camera with an optical filter that is used during supervised learning. The second camera recognizes the optical markers (e.g., bright neon pink or green stickers) in the captured images. This enables the supervisor program to supervise the outcome of a function (e.g., human recognition) so that the weights of the neural nodes in the recognition neural network may be adjusted based on the supervised result. In this way, the default dataset is improved into an updated dataset that more closely matches the real-time environment in which the AGV operates.

Figure 1:
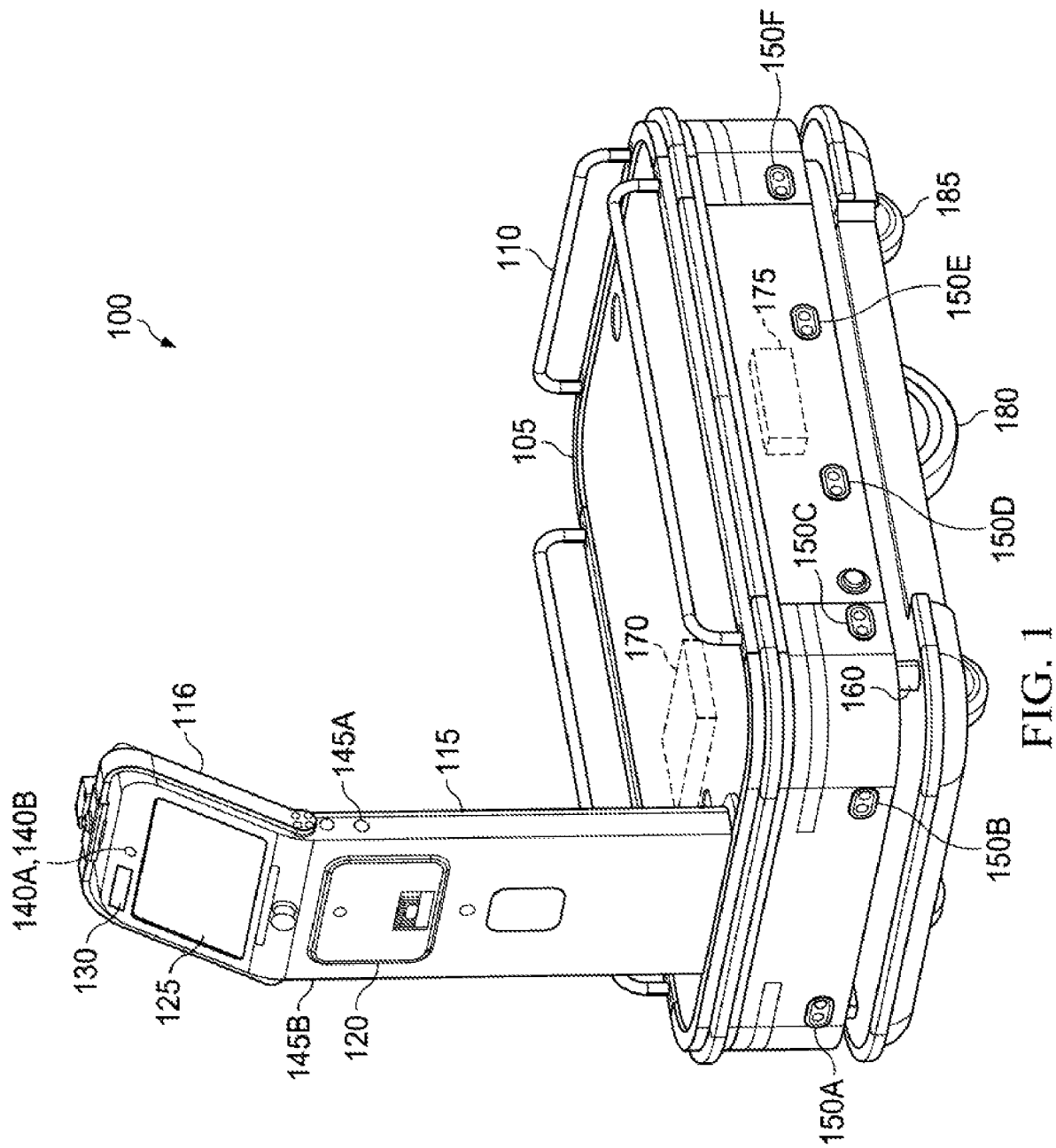
FIG. 1 illustrates an automated guided vehicle (AGV) system according to one embodiment of the disclosure.

FIG. 1 illustrates a perspective view of automated guided vehicle (AGV) 100 according to one embodiment of the disclosure. AGV 100 comprises self-driving, mobile base 105 and an upright console that includes lower console 115 and upper console 116. Lower console 115 comprises sweep code unit 120 and lateral cameras 145A and 145B. Upper console 116 comprises touchscreen 125, main camera 140, and wireless communication unit 130. In an advantageous embodiment, main camera 140 may comprise a pair of cameras, including camera 140A and camera 140B. Camera 140B may include a color filter that is used to train the recognition neural network that helps control the operations of AGV 100. Cameras 140A and 140B are forward looking and lateral cameras 145A and 145B look to the left and right of AGV 100, respectively. Together, main cameras 140A and 140B and lateral cameras 145A and 145B provide 270 degrees of visual coverage. Optionally, a rearward facing camera (not shown) may be added to upper console 116 or to the rear of mobile base 105 to provide complete e60 degree visual coverage.

Mobile base 105 comprises a plurality of guard rails 110, a plurality of ultrasonic sensors, including ultrasonic sensors 150A-150F, a plurality of laser sensors, including LiDAR sensor 160, main control unit 170, electromechanical module 175, drive wheel 180, and stabilizing wheels 185. Guard rails 110 are located on the periphery of the upper surface of mobile base 105. As AGV 100 moves through a warehouse or other facility, guard rails 110 keep inventory items that are jostled by movement from sliding off the upper surface of base 105.

Touchscreen 125 is configured to display information and to allow the user (or operator) to control the operation of the AGV 100. Touchscreen 125 is only one type of user interface that may be used. Alternatively, AGV 100 may include any suitable user input device that provides commands, a map of the facility, routing information, inventory information, and inventory holder, and the like. Advantageously, the user can override the automatic operation of AGV 100 and take manual control of AGV 100. This is particularly useful in network training mode, described below in greater detail, during which supervised learning is used to update and improve the default dataset of AGV 100.

Main control unit 170 controls the overall operation of AGV 100. Main control unit 170 receives proximity information regarding surrounding objects from ultrasonic sensors 150A-150F and LiDAR sensor 160, as well as from forward-looking main cameras 140A and 140B and lateral cameras 145A and 145B. In response to the received proximity information, main control unit 170 is configured to guide AGV 100 through the factory or warehouse in which AGV 100 operates.

Mobile base 105 includes a plurality of drive wheels 180 and a plurality of stabilizing wheels 185 that are controlled by main control unit 170 to move and to steer AGV 100. In an exemplary embodiment, electromechanical module 175 comprises one or more electrical motors that are controlled by main control unite 170 and that rotate drive wheels 185. Electromechanical module 175 may also include a lift system that adjusts the height of mobile base 105 in order to load and unload inventory.

Mobile base 105 may comprise two drive wheels 180 and four stabilizing wheels 185. Stabilizing wheels 185 may be caster-type wheels positioned at the four corners of mobile base 105. Drive wheels 180 may be located underneath mobile base 105 between the front stabilizing wheels 185 and the rear stabilizing wheels 185. Each of drive wheels 180 is configured to rotate in any given direction and at varying speed by the electrical motors controlled by main control unit 170. For example, drive wheels 180 may rotate and move AGV 100 forward, backwards and laterally in the X-Y plane of the floor. Drive wheels 180 may be controlled to rotate at different speeds and in different directions in order to make turns or spin AGV 100 around.

According to the principles of the present disclosure, main control unit 170 may include a recognition neural network that analyzes visual data captured by, for example, cameras 140A and 140B and uses the visual data to perform certain functions, such as a human recognition function, a people following function, a self-navigation function, an obstacle avoidance function, and other routine functions of conventional AGV systems.

As is well known, a neural network comprises layers of computational nodes called neurons, with connections between the different layers. A neural network transforms data until the neural network can classify the data as an output. Each node multiplies an initial value by a selected weight, adds the results with other values coming into the same node, adjusts the resulting number by a selected bias of the node, and then normalizes the output with an activation function.

A neural network implements an iterative learning process in which records (rows) are presented to the network individually, and the weights associated with the input values are adjusted each time. After the records are presented, the process is often repeated (or iterated). During this learning phase, the neural network trains by adjusting the weights to predict the correct class label of input samples. Advantageously, a neural network has a high tolerance to noisy data and an ability to classify patterns on which the neural network has not been trained. The most popular neural network algorithm is the backpropagation algorithm. Once a neural network has been structured for a particular application, the neural network is trained. To start this process, the initial weights may be chosen randomly and the training or learning process begins.

The network processes the records in the default dataset (or training set) one at a time, using the weights and functions in the hidden layer(s) of the neural nodes, and then compares the resulting outputs against the desired outputs. Errors are propagated back through the neural network, thereby adjusting the weights for application to the next record. This process occurs repeatedly as the weights of the nodes are modified. During the training process, the same set of data is processed many times as the connection weights are continually adjusted.

Figure 2:
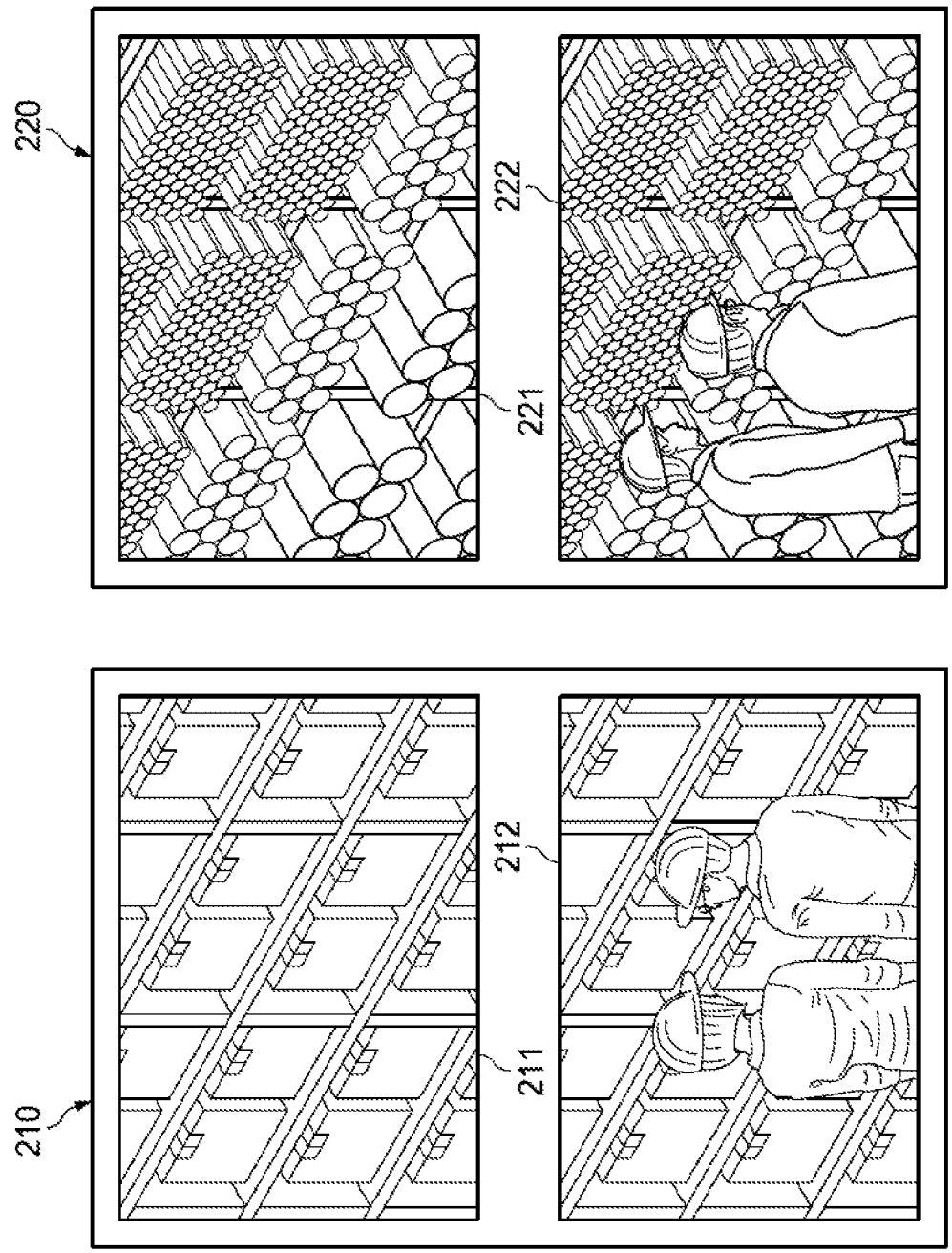
FIG. 2 illustrates images in a default dataset and a real-time, real-world environment according to one embodiment of the disclosure.

FIG. 2 illustrates images in a default dataset and in a real-time, real-world environment according to one embodiment of the disclosure. Image 211 shows a warehouse interior in default dataset 210. Image 212 shows workers in default dataset 210. Image 221 is a captured image of an actual warehouse in real-world environment 220. Image 222 is a captured image of actual workers in real-world environment 220.

There are significant differences between the default warehouse in image 211 and the default workers in image 212 used to train the recognition neural network in AGV 100 and the real-world warehouse in image 221 and the real-world workers in image 222. As a result, the image recognition neural network in AGV 100 is not able to recognize the real-world shelves and storage racks due to the difference of structure type and is not able to recognize the real-world workers due to the difference of the dress or uniforms.

Figure 3:
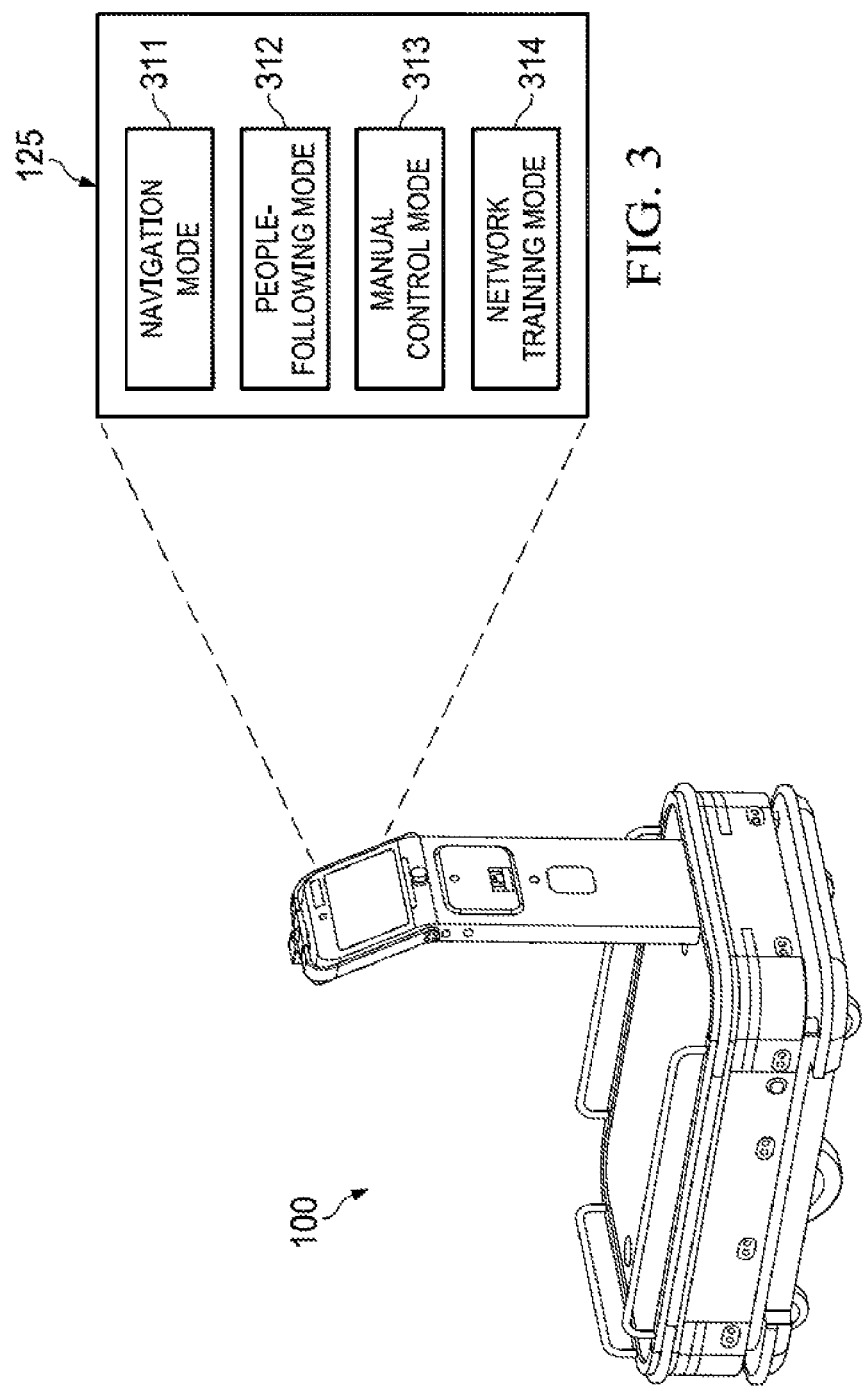
FIG. 3 illustrates an operator or user control screen on an AGV system according to one embodiment of the disclosure.

FIG. 3 illustrates an operator or user control panel on touchscreen 125 of AGV system according to one embodiment of the disclosure. The control panel includes numerous menu options, including Navigation Mode 311, People-Following Mode 312, Manual Control Mode 313, and Network Training Mode 314. By selecting Network Training Mode 314, the user of AGV 100 launches a supervisor program that can be used to train the recognition neural network to recognize new images and to update the default dataset to more closely reflect the real-world environment.

Figure 4:
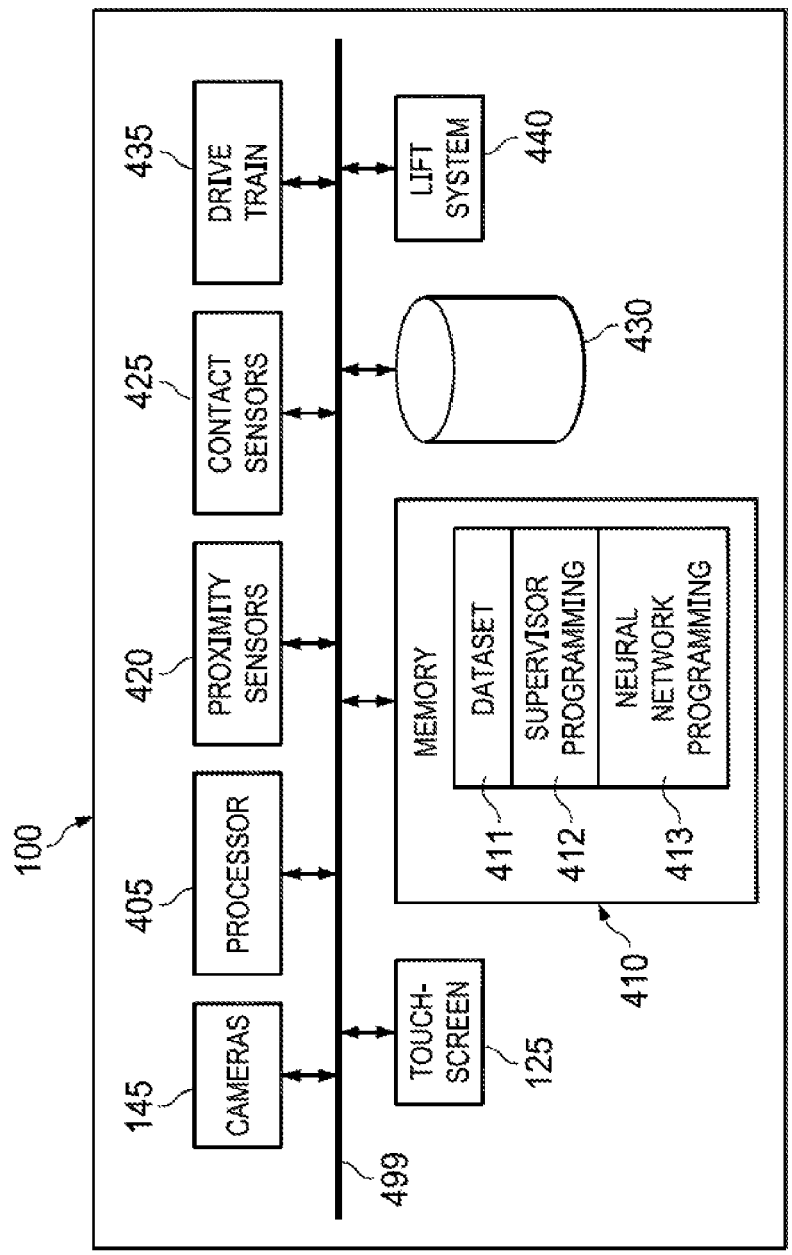
FIG. 4 illustrates in greater detail selected subsystems in an automated guided vehicle (AGV) system according to one embodiment of the disclosure.

FIG. 4 illustrates in greater detail selected subsystems in automated guided vehicle (AGV) system 100 according to one embodiment of the disclosure. The selected subsystems include, among others, some components in main control unit 170 and some components in electromechanical module 175. Data bus 499 provides a communication path between touchscreen 125, camera(s) 145, processor 405, memory 410, proximity sensors 420, contact sensors 425, storage 430, lift system 440, and drive train 435. Lift system 440 and drive train 435 may be components in electromechanical module 175. Processor 405, memory 410, and storage 430 may be components in main control unit 170.

Memory 410 may comprise a combination of dynamic random access memory (DRAM) and static random access memory (SRAM). Memory 410 comprises dataset 411, supervisor program 412, and recognition neural network program 415. Dataset 411, supervisor program 412, and recognition neural network program 415 may normally be stored in storage 430, which may be, for example, Flash RAM or an optical storage disk. Processor 405 loads dataset 411, supervisor program 412, and recognition neural network program 415 into memory 410 upon startup. According to the principles of the present disclosure, processor 405 executes neural network program 413 and supervisor program 412 in order to train the recognition neural network in the real-world environment.

Figure 5:
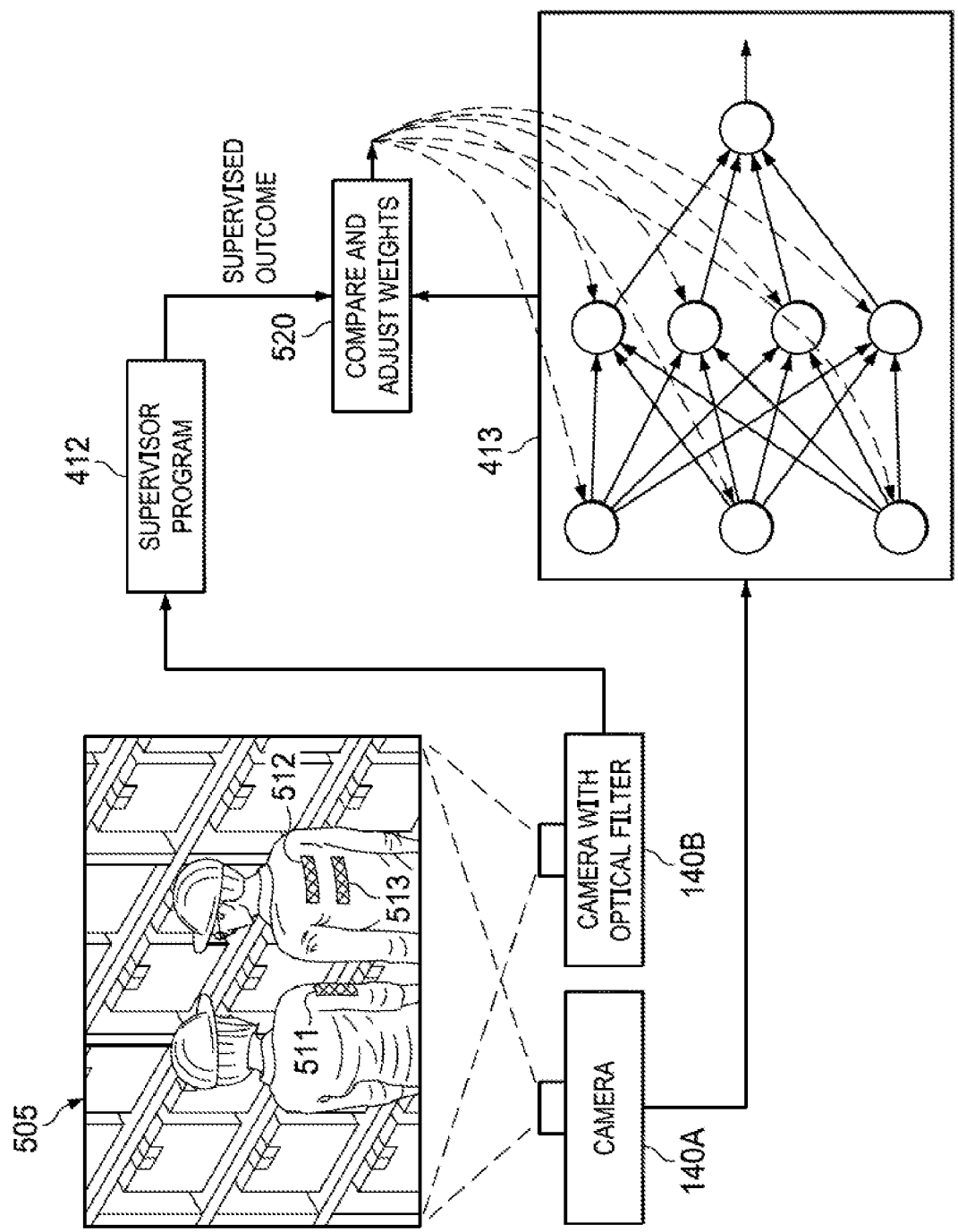
FIG. 5 illustrates an example of real-time supervised learning according to the principles of the present disclosure.

FIG. 5 illustrates an example of real-time supervised learning according to the principles of the present disclosure. Image 505 of the real-world environment in a customer facility contains various objects (e.g., people, shelves, racks, inventory) that may not be recognized by neural network program 413, such as people wearing special safety vests and helmets. Neural network program 413, which is trained by the default dataset 411, may not, for example, recognize the workers with helmets and vests because of the lack of these images in the default dataset 411.

According to the principles of the present disclosure, this problem may be corrected by adding special optical markers to the clothing and helmets of people in the image 505 and using supervisor program 412 to train the neural network program 413 to recognize the people bearing the optical markers. By way of example, optical marker 511, which may comprise a special coating or special color, is physically attached to the shirt of the person to the left in image 505. Similarly, optical markers 512 and 513 are physically attached to the back of the vest of the person to the right in image 505.

Camera 140A captures images that are input to neural network program 413. Camera 140B, which uses an optical filter that is capable of detecting markers 511-513, captures images that are input to supervisor program 412. The additional camera with an optical filter is used to identify the special coating of the target (people, shelf, inventory, etc.) in order to supervise the outcome of the neural network program 413 and update the weights of nodes in neural network program 413. The user or operator of AGV 100 is able to use the supervisor program 412 to force an association of targets tagged by markers 511-513 into selected categories, such as recognized human, human to be followed, obstacles, and the like.

Thus, supervisor program 412 produces a supervised outcome in which targets tagged by optical markers 511-513 are now recognized objects that are associated with categories. Block 520, which may be a processing step executed by supervisor program 412, compares the supervised outcome with the "normal" outcome of neural network program 413 produced by the default dataset 411. Based on the comparison, supervisor program 412 adjusts the weights of each neural node in neural network program 413 based on the supervised outcome, as indicated by the dotted lines from the output of processing block 520 to the nodes in neural network program 413. In this manner, neural network program 413 is trained by supervisor program 412 using real-world images that improve and update the default dataset 411.

Figure 6:
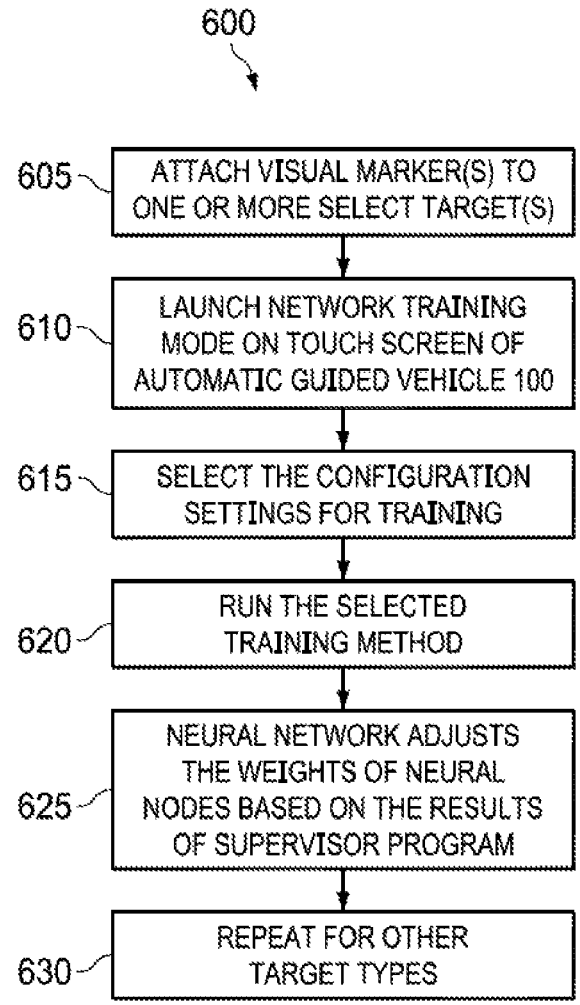
FIG. 6 is a flow diagram illustrating real-time supervised learning according to one embodiment of the present disclosure.

FIG. 6 illustrates flow diagram 600, which shows real-time supervised learning according to one embodiment of the present disclosure. In 605, the user of AGV 100 attaches visual marker(s) to one or more select target(s). In 610, the user launches Network Training Mode on touchscreen 125 of AGV 100. In 615, the user selects the configuration settings for training. For example, the user may select the type of target for training: i) human; ii) shelf; or iii) inventory. The user may also select the type of visual feature to recognize, such as a particular coating, or pattern, or other optical marker.

In 620, the supervisor program 412 runs the selected training method and supervisor program 412 produces supervised outcomes. In 625, the nodes of the neural network are adjusted by modifying the weights of neural nodes based on the supervised outcomes. Thereafter, in 630, this procedure may be repeat for other target types. Thus, the dataset 411 may be iteratively updated with new recognized targets that correspond to images of people, shelves, inventory, and the like in the real-world environment.

Figure 7:
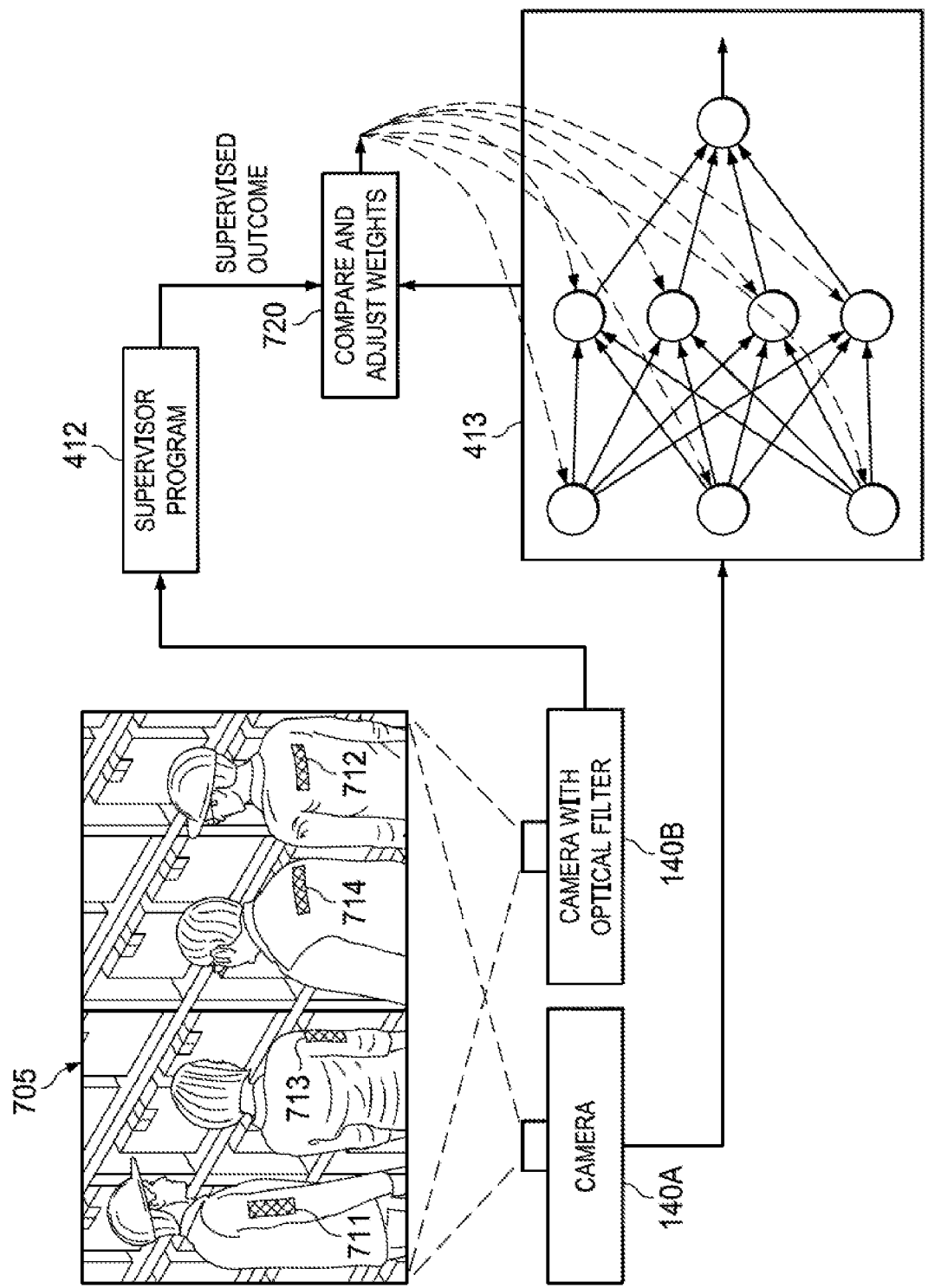
FIG. 7 illustrates an example of real-time supervised learning for human recognition according to the principles of the present disclosure.

FIG. 7 illustrates an example of real-time supervised learning for human recognition according to the principles of the present disclosure. In FIG. 7, it is assumed that the recognition neural program 413 has been trained to recognize only people wearing ordinary casual clothing, such as suits, slacks, dress shirts, jackets, blouses, skirts, and the like. It is further assumed that the recognition neural network program 413 has not been trained to recognize people wearing safety helmets.

However, image 705 of the real-world environment in a customer facility contains people wearing casual clothing (e.g., two persons in center), as well as people wearing special safety vests and helmets (e.g., person on left and person on right). Therefore, the neural network program 413, which is trained by the default dataset 411, may recognize the two persons in the center of image 705, but may not be able to recognize the workers on the left and right who are wearing helmets and vests because of the lack of these images in the default dataset 411.

As in FIG. 5, the real-time supervised learning for human recognition example of FIG. 7 may correct this problem by adding special optical markers 711-714 to the clothing and helmets of the people in image 705 and using supervisor program 412 to train the neural network program 413 to recognize the people bearing the optical markers 711-714. Supervisor program 412 produces a supervised outcome in which targets tagged by optical markers 711-714 are now recognized objects that are associated with categories. Block 720, which may be a processing step executed by supervisor program 412, compares the supervised outcome with the "normal" outcome of neural network program 413 produced by the default dataset 411. Based on the comparison, supervisor program 412 adjusts the weights of each neural node in neural network program 413 based on the supervised outcome, as indicated by the dotted lines from the output of processing block 720 to the nodes in neural network program 413. In this manner, neural network program 413 is trained by supervisor program 412 using real-world images that improve and update the default dataset 411.

Figure 8:
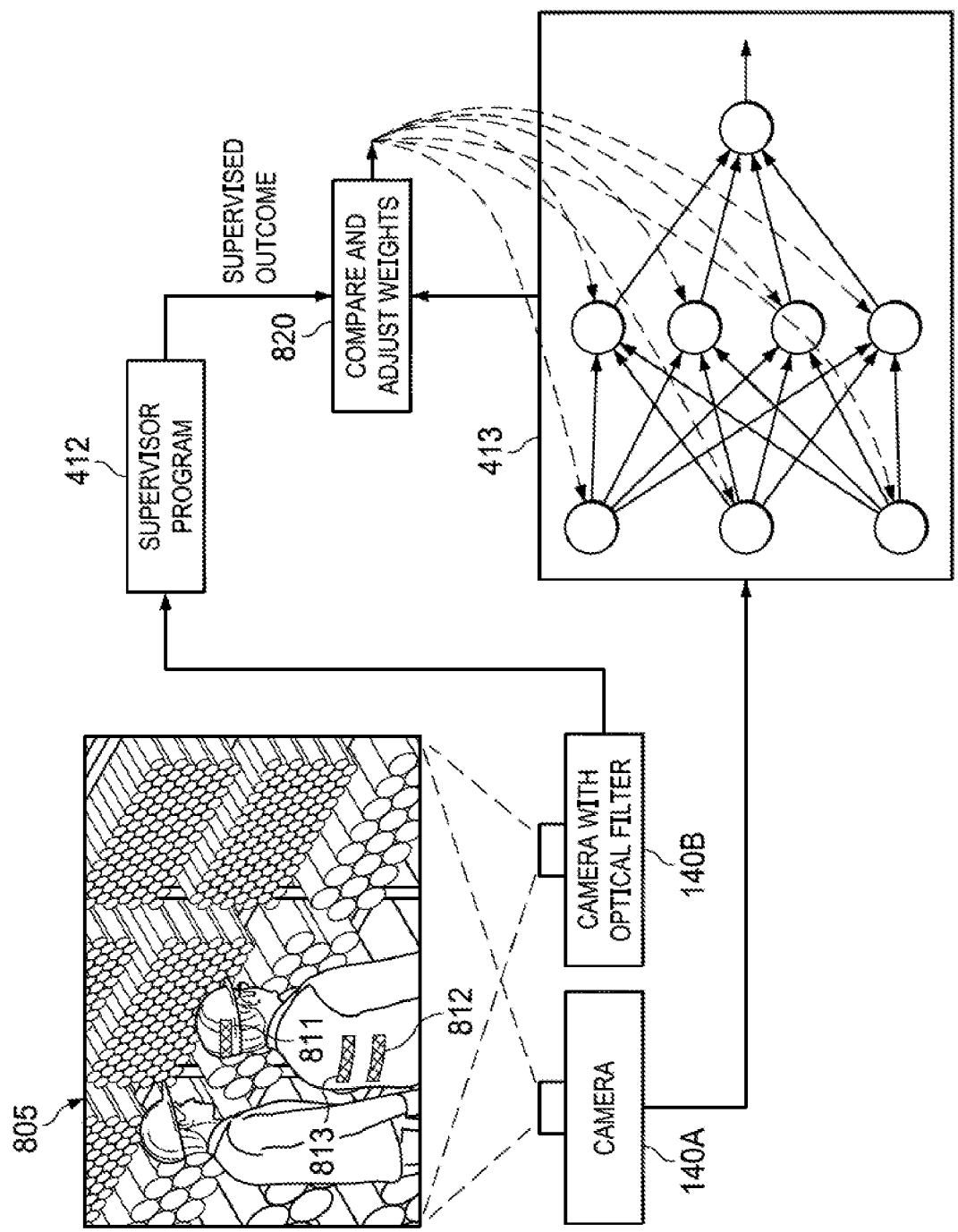
FIG. 8 illustrates an example of real-time supervised learning for people following recognition according to the principles of the present disclosure.

FIG. 8 illustrates an example of real-time supervised learning for people following recognition according to the principles of the present disclosure. In FIG. 8, image 805 shows the real-world environment inside a warehouse. It is desired that AGV 100 follows the person on the right wearing a jacket and helmet, but not follow the person on the left wearing a vest and a helmet.

As before, AGV 100 may be trained to do this by adding special optical markers 811-813 to the clothing and helmet of the person on the right in image 805 and using supervisor program 412 to train the neural network program 413 to recognize the person bearing the optical markers 811-813. Supervisor program 412 produces a supervised outcome in which targets tagged by optical markers 811-813 are now recognized objects that are associated with the category "target-to-follow". Block 820, which may be a processing step executed by supervisor program 412, compares the supervised outcome with the "normal" outcome of neural network program 413 produced by the default dataset 411. Based on the comparison, supervisor program 412 adjusts the weights of each neural node in neural network program 413 based on the supervised outcome, as indicated by the dotted lines from the output of processing block 820 to the nodes in neural network program 413. In this manner, neural network program 413 is trained by supervisor program 412 using real-world images that improve and update the default dataset 411. After training, neural network program 413 will able to learn what kind of features will be the keys to identify the target to follow. Without the disclosed training method, it is easy neural network program 413 to misrecognize and follow the wrong person.

Figure 9:
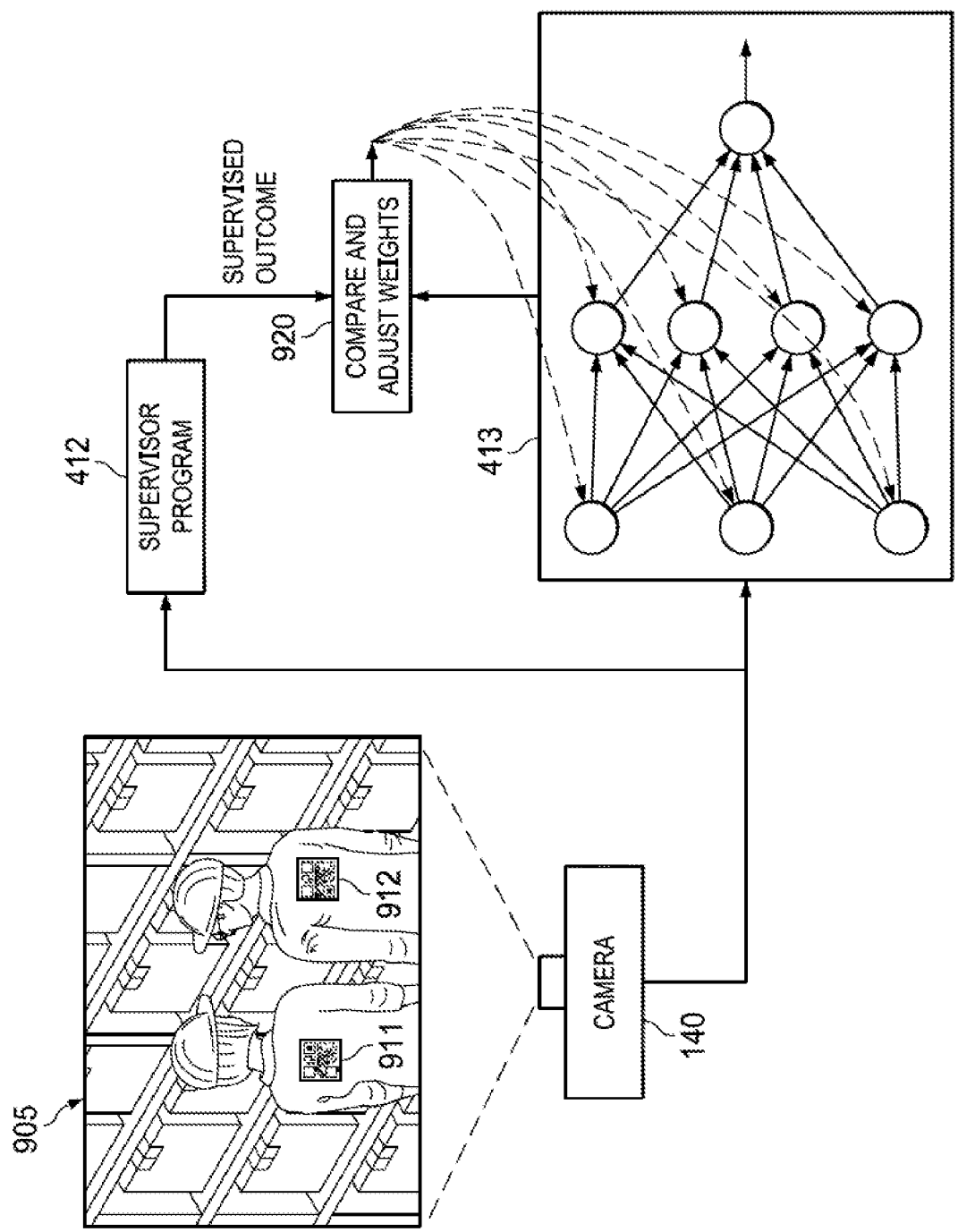
FIG. 9 illustrates an example of real-time supervised learning using only one camera according to the principles of the present disclosure.

FIG. 9 illustrates an example of real-time supervised learning using only one camera according to an alternate embodiment of the present disclosure. In FIG. 9, no color filter or similar content filter is used in conjunction with a second camera. Instead, the same camera 140 provides captured images to both neural network program 413 and supervisor program 412. In this instance, however, QR code markers 911 and 912 are physically attached to targets in image 905. Supervisor program 412 is configured to identify QR code markers 911 and 912 and therefore recognizes the target(s). On the other hand, the untrained neural network 413 is configured to ignore QR code markers 911 and 912 and uses the remaining parts of image 905 to complete the recognition process.

Supervisor program 412 produces a supervised outcome in which targets tagged by QR code markers 911 and 912 are now recognized objects that are associated with a selected category, such as "human" or "target-to-follow". Block 920, which may be a processing step executed by supervisor program 412, compares the supervised outcome with the "normal" outcome of neural network program 413 produced by the default dataset 411. Based on the comparison, supervisor program 412 adjusts the weights of each neural node in neural network program 413 based on the supervised outcome, as indicated by the dotted lines from the output of processing block 920 to the nodes in neural network program 413.

Advantageously, the disclosed method and apparatus described herein will make the camera(s) of AGV 100 better at recognizing people and which people (or other targets) should be followed. The disclosed method and apparatus will also make the camera better at recognizing and distinguishing between an obstacle or human. If a human blocks the way, AGV 100 is more likely to recognize a person and slow down or stop for safety. The disclosed method and apparatus also will make the camera(s) better at recognizing shelves and marker located on shelves for positioning AGV 100.

In the descriptions above, the disclosed system and method of machine learning in an on-site environment is implemented in an exemplary warehouse transportation vehicle. However, this is by way of illustration only and should not be construed to narrow the scope of this disclosure and the claims herein. More generally, the AGV described above, may be any type of autonomously movable vehicle or self-driving cart, trunk, suitcase, and the like that employs vision sensors. For example, alternate embodiments of AGV 100 may include motorized self-driving luggage, motorized self-driving shopping carts, robotic lawn mowers, unmanned aerial vehicles (UAVs), unmanned underwater vehicle, driverless cars, autonomous forklifts, transportation robots, and the like.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An automatic guided vehicle (AGV) comprising:
a mobile base configured to operate the AGV in a self-navigation mode;
a camera configured to capture image data of at least one object; and
a main control module configured to:
receive the image data from the camera;
execute a recognition neural network program operable to recognize the at least one object in the image data;
execute a supervisor program under user control, the supervisor program configured to receive the image data and to recognize at least one marker attached to the at least one object in the image data, the supervisor program further configured to produce a supervised outcome in which the at least one object to which the at least one marker is attached is a target and is associated with a category; and
use the supervised outcome to adjust at least one weight of at least one node in the recognition neural program.

2. The automatic guided vehicle (AGV) of claim 1, wherein the recognition neural network program is configured to ignore the markers of the image data.

3. The automatic guided vehicle (AGV) of claim 1, wherein the at least one marker comprises a QR code marker.

4. The automatic guided vehicle (AGV) of claim 1, wherein the supervisor program is configured to associate the target to which the at least one marker is attached with the category based on user input commands.

5. The automatic guided vehicle (AGV) of claim 4, wherein the category comprises human recognition.

6. The automatic guided vehicle (AGV) of claim 1, wherein in response to the supervised outcome, the supervisor program is configured to update a default dataset associated with the recognition neural network program using real-world information associated with the supervised outcome.

7. The automatic guided vehicle (AGV) of claim 6, wherein the real-world information is associated with clothing worn by persons in the image data.

8. A supervised learning system comprising:
a camera configured to capture image data of at least one object; and
a main control module configured to:
receive the image data from the camera;
execute a recognition neural network program operable to recognize the at least one object in the image data;
execute a supervisor program under user control, the supervisor program configured to receive the image data and to recognize at least one marker attached to the at least one object in the image data, the supervisor program further configured to produce a supervised outcome in which the at least one object to which the at least one marker is attached is a target and is associated with a category; and
use the supervised outcome to adjust at least one weight of at least one node in the recognition neural program.

9. The supervised learning system of claim 8, further comprising a mobile base configured to carry the camera and operate in a self-navigation mode.

10. The supervised learning system of claim 8, wherein the at least one marker comprises a QR code marker.

11. The supervised learning system of claim 8, wherein the supervisor program is configured to associate the target to which the at least one marker is attached with the category based on user input commands.

12. The supervised learning system of claim 11, wherein the category comprises human recognition.

13. The supervised learning system of claim 8, wherein in response to the supervised outcome, the supervisor program is configured to update a default dataset associated with the recognition neural network program using real-world information associated with the supervised outcome.

14. The supervised learning system of claim 13, wherein the real-world information is associated with clothing worn by persons in the image data.

15. A method of training an automatic guided vehicle (AGV) comprising a mobile base configured to drive the AGV in a self-navigation mode, the method comprising:

capturing image data of at least one object with a camera;

receiving the image data from the camera in a main control module;

executing a recognition neural network program in the main control module, the recognition neural network program configured to recognize the at least one object in the image data;

executing a supervisor program under user control in the main control module, the supervisor program configured to receive the image data and to recognize at least one marker attached to the at least one object in the image data, the supervisor program further configured to produce a supervised outcome in which the at least one object to which the at least one marker is attached is a target and is associated with a category; and using the supervised outcome to adjust at least one weight of at least one node in the recognition neural network program.

16. The method of claim 15, wherein the at least one marker comprises a QR code marker.

17. The method of claim 15, wherein the supervisor program is configured to associate the target to which the at least one marker is attached with the category based on user input commands.

18. The method of claim 17, wherein the category comprises human recognition.

19. The method of claim 15, wherein in response to the supervised outcome, the supervisor program is configured to update a default dataset associated with the recognition neural network program using real-world information associated with the supervised outcome.

20. The method of claim 19, wherein the real-world information is associated with clothing worn by persons in the image data.

* * * * *